S. W. MUDGE.
Churn.

No. 33,262.

Patented Sept. 10, 1861.

Witnesses

Inventor
S. W. Mudge

UNITED STATES PATENT OFFICE.

S. W. MUDGE, OF ROME, NEW YORK.

IMPROVED CHURN.

Specification forming part of Letters Patent No. 33,262, dated September 10, 1861.

*To all whom it may concern:*

Be it known that I, S. W. MUDGE, of Rome, in the county of Oneida and State of New York, have invented a new and Improved Churn; and I do hereby declare that the following is a full, clear, and exact description of the same, reference being had to the annexed drawings, making a part of this specification, in which—

Figure 1:
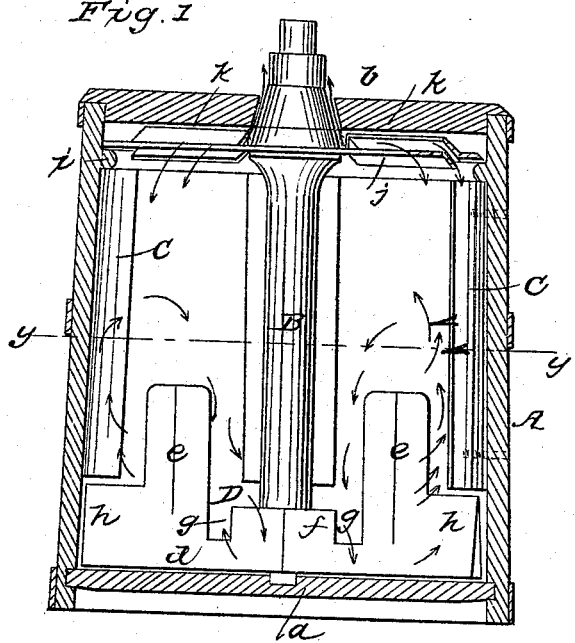
Figure 3:
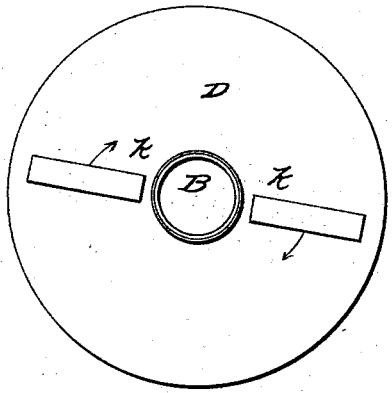
Figure 2:
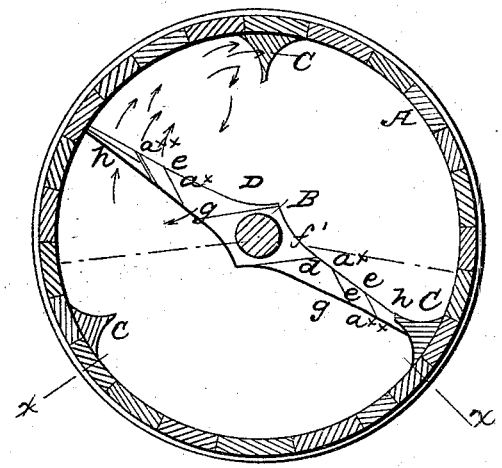

Figure 1 is a sectional elevation of my invention, taken in the line $x\ x$, Fig. 2; Fig. 2, a horizontal section of the same in the line $y\ y$, Fig. 1; Fig. 3, a plan or top view of the inner plate of the same.

Similar letters of reference indicate corresponding parts in the several figures.

This invention consists in the employment or use of a rotating dasher of peculiar construction in connection with ribs provided with concave sides and attached to the inner side of the case, all being arranged as hereinafter described, whereby the cream as the dasher is rotated is subjected to a great agitation, sufficiently so to remove the coating of the globules containing the butter in a very short time and without injuring its "grain" and communicating to it that oily taste and insipidity produced by subjecting the cream to an undue action and violently breaking or rupturing the globules.

To enable those skilled in the art to fully understand and construct my invention, I will proceed to describe it.

A represents the case of the churn, which may be of cylindrical or conical form and provided with a central shaft B, the lower end of which is stepped at the center of the bottom of the churn, as shown at $a$, the upper end of the shaft having its bearing in the lid $b$ of the churn, as shown in Fig. 1.

To the inner side of the case A there are attached ribs C. Any proper number may be used. Three or four would, however, probably be sufficient. These ribs have each two concave sides $c\ c$, as shown clearly in Fig. 2, and the ribs do not extend down to the bottom of the churn, a sufficient space being allowed to admit of the ends of the dasher working below them.

The dasher D is formed of a horizontal bar $d$, attached to or placed on the lower end of the shaft B. This bar is provided near its ends with two uprights $e\ e$, which are of lozenge form in their transverse section, as shown clearly in Fig. 2. The central portion $f$ of the bar $d$ is also of lozenge form, as shown in Fig. 2, and there is a recess $g$ in the bar $d$ between each upright $e$ and the central portion $f$, as shown clearly in Fig. 1.

The outer parts $h\ h$ of the bar $d$ beyond the uprights $e\ e$ are considerably higher than the other part, and said parts $h$ work under the ribs C, as shown clearly in Fig. 1. The parts $h$ of the bar $d$ are of inverted-V form in their transverse section.

The operation is as follows: As the shaft B is rotated the uprights $e\ e$ project the cream against the ribs C, which, in consequence of having concave sides, deflect the cream toward the center of the churn or shaft B, said motion being favored by the inner parts $a^\times$ of the uprights $e$, the outer parts $a^{\times\times}$ of the uprights projecting the cream toward the ribs. The cream passes down to the bottom of the churn, and is then impelled by centrifugal force outward to the side of the case A and upward, the latter motion being given it by the outer parts $h\ h$ of the bar $d$, and the uprights then act as before and project it against the ribs. Thus it will be seen that each rib in connection with the dasher forms a whirlpool within the churn or case A, as shown by the arrows in Figs. 1 and 2, and the cream is agitated to such a degree as to cause butter to be produced in a very short time.

On the upper part of the shaft B there is placed a circular plate D, which rotates with the shaft and rests on a ledge $i$ at the inner side of the churn, as shown in Fig. 1. This plate D has two radial slots or openings $j\ j$ made in it, over which hoods $k$ are placed, as shown in Fig. 1. These hoods as the shaft B rotates cause air to be introduced or forced into the churn, thereby favoring to a certain degree the production of the butter.

I do not claim the forcing of atmospheric air into the churn during the process of churning, for that has been previously done; but I do claim as new and desire to secure by Letters Patent—

The arrangement of the dasher-bar $d$, uprights $e\ e\ f$, recesses $g$, and lateral projections $h\ h$, with the double concave ribs and case A, as and for the purpose herein shown and described.

S. W. MUDGE.

Witnesses:
 L. E. ELMER,
 H. M. LAWTON.